Figure 1:
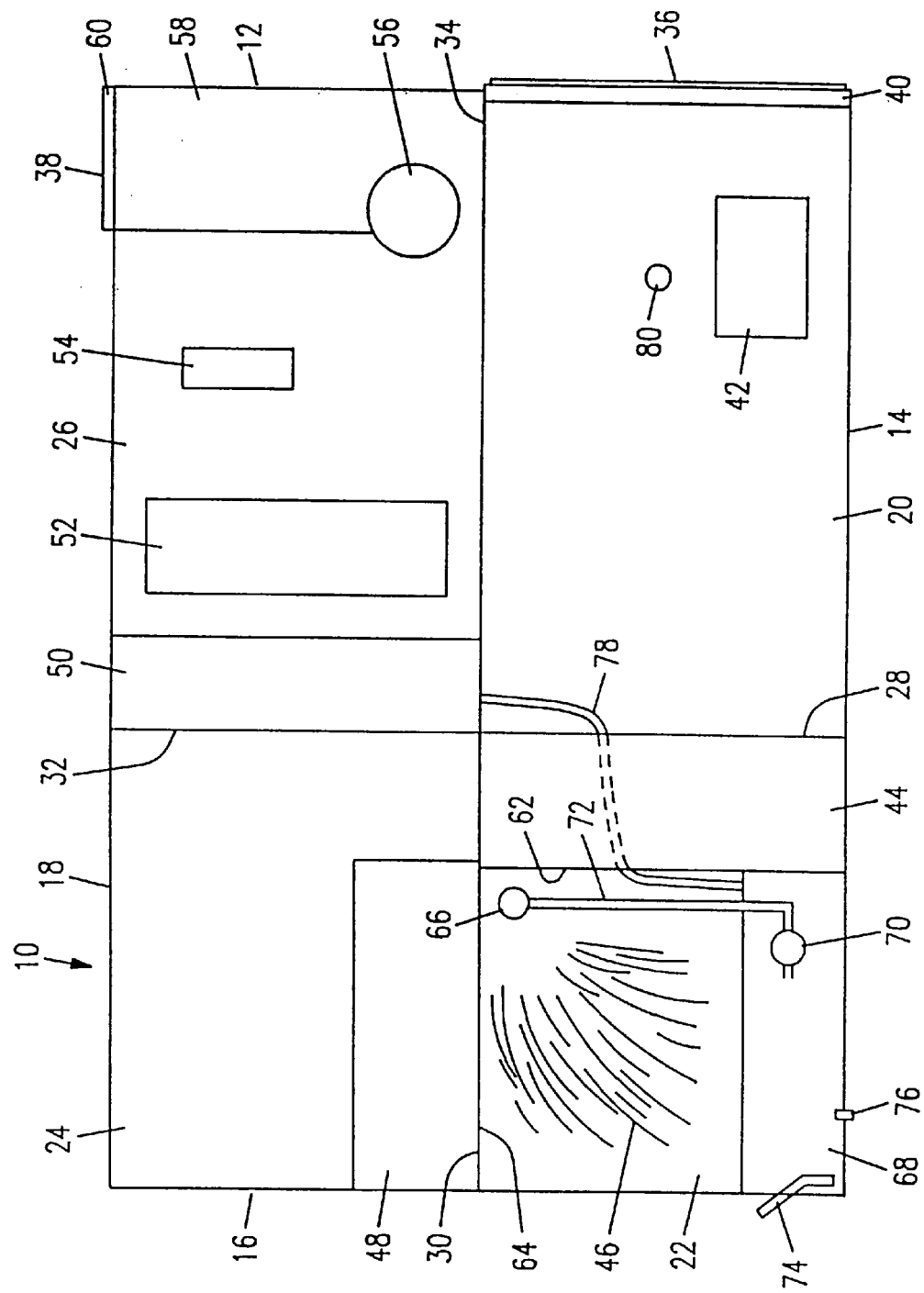

US005908494A

United States Patent [19]

Ross et al.

[11] Patent Number: 5,908,494
[45] Date of Patent: Jun. 1, 1999

[54] LIQUID SPRAY AIR PURIFICATION APPARATUS

[75] Inventors: Bradley J. Ross, Tucson, Ariz.; Carl J. Ross, Citrus Heights, Calif.; Timothy Wandell, Honolulu, Hi.; Jeffrey S. Ross, Tucson, Ariz.

[73] Assignee: Earth First Air Systems, Inc., Tucson, Ariz.

[21] Appl. No.: 08/757,758

[22] Filed: Nov. 27, 1996

Related U.S. Application Data

[60] Provisional application No. 60/011,086, Feb. 2, 1996, and provisional application No. 60/023,635, Aug. 9, 1996.

[51] Int. Cl.[6] .................. B01D 47/06

[52] U.S. Cl. .................. 96/356; 96/365; 96/224; 96/234; 96/265; 55/418; 55/440; 55/318; 55/472

[58] Field of Search .................. 55/257.2, 419, 55/279, 229, 257.3, 257.5, 257.6, 257.1, 440, 442, 443, 444, 418, 327, 472, 318; 96/365, 154, 355, 356, 360, 358, 224, 265, 234

[56] References Cited

U.S. PATENT DOCUMENTS

| | | | |
|---|---|---|---|
| 813,217 | 2/1906 | Kinealy . | |
| 1,042,864 | 10/1912 | Winks . | |
| 1,514,835 | 11/1924 | Darrah . | |
| 1,846,875 | 2/1932 | Karr et al. | 55/257.2 |
| 2,057,579 | 10/1936 | Kurth . | |
| 2,090,287 | 8/1937 | Cornelius | 55/257.2 |
| 2,153,267 | 4/1939 | Morse | 55/257.2 |
| 2,233,976 | 3/1941 | Essick . | |
| 2,553,121 | 5/1951 | Touton | 55/257.2 |
| 2,648,395 | 8/1953 | Pond, Jr. | 96/358 |
| 2,802,543 | 8/1957 | Clark . | |
| 2,998,059 | 8/1961 | Johnson | 96/365 |
| 3,006,436 | 10/1961 | Starbuck et al. . | |
| 3,304,783 | 2/1967 | Quigley | 55/419 |
| 3,522,000 | 7/1970 | Kinney . | |
| 3,701,235 | 10/1972 | Isaacson . | |
| 4,810,268 | 3/1989 | Chambers et al. . | |
| 4,954,148 | 9/1990 | Alexander, Sr. . | |
| 5,203,989 | 4/1993 | Reidy | 55/279 |
| 5,250,267 | 10/1993 | Johnson et al. | 55/419 |
| 5,389,120 | 2/1995 | Sewell et al. . | |

FOREIGN PATENT DOCUMENTS

| | | | |
|---|---|---|---|
| 580787 | 10/1976 | Switzerland | 55/257.1 |

*Primary Examiner*—Jay H. Woo
*Assistant Examiner*—Robert Hopkins
*Attorney, Agent, or Firm*—Jerome M. Teplitz

[57] ABSTRACT

A liquid spray air purification apparatus utilizing at least two liquid migration eliminator members for providing effective containment of substantially all of the spray liquid employed in the system to within a segregated spray liquid loop so as to prevent spray liquid from interfering with the operation of electrical and other auxiliary components within the apparatus and to minimize spray liquid loss from the recirculation cycle. The segregated spray liquid loop is formed by a liquid spray chamber, a spray liquid sump and recirculation means interconnecting the sump and the liquid spray chamber. Auxiliary components include a particulate filter, fan means, germicidal ultraviolet light means, dehumidification means, heating means and a compressor. The apparatus is designed for use in efficiently improving interior environmental air quality within homes, offices, hospitals and the like, and is adaptable for use in motorized vehicles.

24 Claims, 2 Drawing Sheets

LIQUID SPRAY AIR PURIFICATION APPARATUS

This application is a continuation-in-part of the provisional patent application entitled "Volcanic Gas Air Scrubber" by Bradley J. Ross as filed Feb. 2, 1996, with Ser. No. 60/011,086, and of the provisional patent application entitled "Volcanic Gas Air Scrubber" by Bradley J. Ross, Carl J. Ross and Timothy Wandell as filed Aug. 9, 1996, with Ser. No. 60/023,635.

FIELD OF THE INVENTION

The present invention relates generally to environmental air purification apparatus and, more particularly, to an apparatus for improving interior environmental air quality employing a liquid spray system for pollutant removal.

BACKGROUND OF THE INVENTION

Atmospheric pollutants have been posing an ever-increasing threat to interior environmental air quality. This is so not only in major metropolitan areas, but also in some of the less populated and less industrialized regions of the world. The problem is particularly acute, for example, in those areas subject to the effects of the noxious gases and particulates naturally released into the atmosphere from volcanoes before, during and after eruptions.

Volcanic gas, commonly referred to as "vog", is a highly irritating and potentially hazardous mixture of gaseous components, including carbon dioxide, sulfur dioxide, hydrogen sulfide, hydrochloric acid, hydrogen, carbon monoxide, hydrofluoric acid, and other trace gases and volatile metals. The reported adverse health effects of these gases include sore throat, headache, damage to eyes and mucous membranes, bronchitis, asthma, and in extreme circumstances, even death. While most severe in the areas immediately surrounding volcanic vents and fumaroles and in low spots on the flanks of volcanoes, the atmospheric pollution problems caused by vog can sometimes persist for long distances downwind from a volcano and have a rather widespread adverse effect on interior environmental air quality.

Based upon the known water-solubility properties of the noxious gaseous components of vog, the potential exists for vog-contaminated interior environmental air to be effectively purified with the use of aqueous liquid spray air purification techniques. Such techniques are well known in the art, and generally comprise treating a contaminated airstream flowing through a suitable spray chamber with a recirculating liquid spray so as to wash the contaminants from the airstream, followed by a mechanical drying of the washed airstream through a mist eliminator before discharge of the purified airstream. These techniques have been found effective in removal of a number of common air pollutants, including dust, pollen, smoke, aerosols, nitrogen oxides, sulfur dioxide, hydrogen sulfide, hydrochloric acid, carbon dioxide, carbon monoxide and ozone. Nevertheless, liquid spray air purification systems have thus far failed to gain wide acceptance in other than industrial applications. One of the major drawbacks to interior environmental use of these systems has been their high maintenance requirements, which in large part are related to ineffective management and control of the spray liquid within the system.

The Sewell et al U.S. Pat. No. 5,389,120, issued Feb. 14, 1995, represents an attempt to adapt a liquid spray air purification system for residential use by incorporating it into a standard heating, ventilation and air conditioning system installed within the space between the roof and ceiling of a building. However, without an effective solution to the liquid management and control problems within the basic air purification system itself, the installation proposed by Sewell et al would only serve to render the system more difficult to access for servicing its high maintenance requirements.

SUMMARY OF THE INVENTION

The present invention is directed to a liquid spray air purification apparatus specifically designed for effective management and control of the spray liquid employed therein. The apparatus includes a liquid spray chamber disposed within a housing having an airstream inlet opening, an airstream outlet opening, and an airstream flow path extending in a downstream direction within the housing from the airstream inlet opening to the airstream outlet opening and passing through the liquid spray chamber. The liquid spray chamber is provided with upstream entrance and downstream exit openings permitting airstream flow therethrough, and liquid spray means for spraying liquid into the flowing airstream so as to effect washing thereof. The apparatus also includes sump means for holding a quantity of spray liquid to be supplied in a recirculated manner to the liquid spray means and for receiving liquid drainage from the washing of the airstream, and recirculation means for supplying liquid from the sump means to the liquid spray means.

The essential feature of the apparatus of the present invention is in providing effective containment of substantially all of the spray liquid employed therein within a segregated loop formed by the liquid spray chamber, the sump means and the recirculation means. This is achieved through the use of liquid migration eliminator means comprising at least first and second strategically placed liquid migration eliminator members. The first liquid migration eliminator member covers the upstream entrance opening of the liquid spray chamber, and the second liquid migration eliminator member covers the downstream exit opening of the liquid spray chamber.

Exteriorly of the segregated spray liquid loop, the apparatus further includes filter means disposed in the airstream flow path upstream from the first liquid migration eliminator member for removing airborne particulate matter from the airstream flowing therethrough, and fan means for causing downstream-directed airstream flow from the airstream inlet opening along the airstream flow path to the airstream outlet opening. The fan means is preferably disposed in the housing's airstream flow path, either upstream from the first liquid migration eliminator member or downstream from the second liquid migration eliminator member.

For maximizing liquid containment within the segregated spray liquid loop, the apparatus preferably also includes dehumidification means disposed in the housing's airstream flow path downstream from the second liquid migration eliminator member, and being selectively operable to remove entrained moisture from the airstream exiting the second liquid migration eliminator member. The dehumidification means option is preferably used in conjunction with optional heating means disposed in the housing's airstream flow path downstream from the dehumidification means, and being selectively operable to warm the airstream exiting the dehumidification means and thereby reduce the airstream's relative humidity. Another preferred option includable in the apparatus is ultraviolet light means disposed in the housing's airstream flow path exteriorly of the segregated spray liquid loop, and being selectively operable to germicidally treat the airstream flowing thereby.

The containment of spray liquid within its own segregated loop in accordance with the present invention, serves to prevent the spray liquid from damaging or otherwise interfering with the operation of the electrical and other auxiliary components within the housing of the apparatus, thereby reducing the maintenance requirements of the apparatus. It also serves to eliminate or minimize loss of spray liquid from the recirculation cycle so as to enable efficient operation of the apparatus for longer periods of time without spray liquid refill. This provides the apparatus with greater flexibility for use as a portable unit with manual spray liquid filling and draining capabilities rather than having to rely solely upon connection into building plumbing and drainage lines.

The liquid spray air purification apparatus of the present invention is suitable for use in efficiently improving interior environmental air quality within various types of buildings, including homes, apartments, hotels, offices and hospitals. It may also be adapted for use in various motorized vehicles, such as automobiles, buses, trains, ships and aircraft, by employing a wind-drivable fan means and using the atmospheric wind created by the vehicle's motion for driving the fan means.

BRIEF DESCRIPTION OF THE DRAWINGS

FIG. 1 is a schematic side elevational view of a liquid spray air purification apparatus embodying principles of the present invention; and FIG. 2 is a schematic side elevational view of an alternative embodiment of the liquid spray air purification apparatus of FIG. 1.

DESCRIPTION OF PREFERRED EMBODIMENTS

Referring to FIG. 1 of the drawings, a liquid spray air purification apparatus embodying principles of the present invention includes a horizontally oriented hollow rectangular housing 10 made of corrosion-resistant material such as stainless steel, plastic, aluminum or fiberglass. As viewed in FIG. 1, the housing 10 has a right end wall 12, a bottom wall 14, a left end wall 16, and a top wall 18, and is interiorly divided into a lower right compartment 20, a lower left compartment 22, an upper left compartment 24, and an upper right compartment 26. Separation between adjacent compartments is provided by a first open frame member 28 between the two lower compartments 20 and 22, a second open frame member 30 between the two left compartments 22 and 24, a third open frame member 32 between the two upper compartments 24 and 26, and an air-impervious solid partition member 34 between the two right compartments 26 and 20. The housing 10 further has an airstream inlet opening 36 entering into the lower right compartment 20 through the right end wall 12, and an airstream outlet opening 38 exiting from the upper right compartment 26 through the top wall 18.

The above-described structure of the housing 10 permits airstream flow through the housing 10 along a downstream-directed airstream flow path extending from the airstream inlet opening 36, sequentially through the lower right compartment 20, the lower left compartment 22, the upper left compartment 24, and the upper right compartment 26, to the airstream outlet opening 38. Operatively disposed in the airstream flow path, in upstream to downstream order as shown in FIG. 1, are a filter unit 40 and a compressor unit 42 disposed in the lower right compartment 20; a first liquid migration eliminator member 44 and a liquid spray chamber 46 disposed in the lower left compartment 22; a second liquid migration eliminator member 48 disposed in the upper left compartment 24; and a dehumidifying evaporator unit 50, a heating condenser unit 52, an ultraviolet light unit 54, a fan unit 56, an airstream discharge channel 58, and an airstream discharge register 60, all disposed in the upper right compartment 26.

The filter unit 40 is preferably a high efficiency (above 90%) electrostatic filter effective for removing airborne particulate matter from the airstream flowing through it. It is slidably mounted into the housing 10 at the airstream inlet opening 36, and is removable for cleaning.

The liquid spray chamber 46 is disposed in the far left corner of the lower left compartment 22, and has an upstream entrance opening 62 on its right side for horizontal airstream entrance flow and a downstream exit opening 64 on its top side for vertical airstream exit flow. Disposed within the liquid spray chamber 46 is a liquid spray nozzle assembly 66 for spraying liquid into the airstream flowing through the liquid spray chamber 46 so as to effect washing of the airstream. At the bottom of the liquid spray chamber 46 is a sump 68 for holding a quantity of spray liquid to be supplied in a recirculated manner to the liquid spray nozzle assembly 66 and for receiving liquid drainage from the washing of the airstream. A pump 70 is communicatable with spray liquid in the sump 68 and is interconnected to the liquid spray nozzle assembly 66 through conduit 72 for supplying spray liquid from the sump 68 to the liquid spray nozzle assembly 66. The sump 68 is provided with a spray liquid fill port 74 adapted for manual filling, and a spray liquid drain port 76 adapted for manual draining.

The first liquid migration eliminator member 44 is disposed vertically against the downstream side of the first open frame member 28 and completely covers the upstream entrance opening 62 of the liquid spray chamber 46. The second liquid migration eliminator member 48 is supported in a horizontal position on the second open frame member 30 and completely covers the downstream exit opening 64 of the liquid spray chamber 46. The liquid migration eliminator members 44 and 48 are both of the type well known in the art, having a plurality of baffle members defining a zig-zag air flow path through the overall eliminator structure so as to act as a mechanical barrier to the passage of moisture therethrough. Together, the first and second liquid migration eliminator members 44 and 48 provide effective containment of substantially all of the spray liquid employed in the system to within a segregated loop formed by the liquid spray chamber 46, the sump 68, the pump 70 and the conduit 72. One or more additional liquid migration eliminator members may be included at strategic locations within the apparatus if needed for more effectively achieving such containment, such as, for example, in particularly heavy duty spray action requirement applications.

The dehumidifying evaporator unit 50, the heating condenser unit 52 and the compressor unit 42 are all standard components of a conventional compression refrigeration system, and they are operatively interconnected as such within the housing 10 for conventional circulation of refrigerant from the compressor unit 42 to the heating condenser unit 52 to the dehumidifying evaporator unit 50 and back to the compressor unit 42. This refrigeration cycle is selectively operable to enable the dehumidifying evaporator unit 50 to remove entrained moisture from the airstream exiting the second liquid migration eliminator member 48, and simultaneously to enable the heating condenser unit 52 to warm the airstream exiting the dehumidifying evaporator unit 50 and thereby reduce the relative humidity of the airstream. For this latter purpose, other heating means, such as an electric or gas heating element, may be used in place of or in addition to the heating condenser unit 52 if desired. The moisture removed from the airstream by the dehumidifying evaporator unit 50 is drained to the sump 68 by way of tubing 78 extending from the dehumidifying evaporator unit 50 to the sump 68 through the first liquid migration eliminator member 44, thereby providing more effective containment of spray liquid within its segregated loop. The positioning of the compressor unit 42 in the entering airstream flow path within the lower right compartment 20, enables effective cooling of the compressor unit 42 by the airstream flowing thereby. The operation of the refrigeration cycle is controlled by a conventional humidistat 80, positioned with the compressor unit 42 in the lower right compartment 20.

The inclusion in the airstream flow path through the housing 10 of the ultraviolet light unit 54, is a highly significant and preferred option, made possible through the effective containment of the spray liquid within its segregated loop. The ultraviolet light unit 54 is selectively operable to germicidally treat the airstream flowing thereby so that the discharged airstream will be cleansed not only of noxious gases and airborne particulate matter, but also of bacterial, viral and other germs. This renders the apparatus particularly suitable for use in hospitals and doctors' offices.

The fan unit 56 is operative for causing downstream-directed airstream flow along the airstream flow path from the airstream inlet opening 36, sequentially through the four compartments 20, 22, 24 and 26, to the airstream outlet opening 38. While the fan unit 56 is illustrated in FIG. 1 as being positioned at the downstream end of the airstream flow path in the upper right compartment 26, it could alternatively be positioned at the upstream end of the airstream flow path in the lower right compartment 20.

All of the various electrical controls for operation of the liquid spray air purification apparatus illustrated in FIG. 1, are conveniently disposed within the lower right compartment 20. Again, this is made possible through the effective containment of the spray liquid within its segregated loop and out of contact with the electrical system. These electrical controls (not shown) include a pH control for cycling the unit on and off on set pH values responsive to a pH probe in the sump 68, and for operating control indicator lights; a liquid level control for cycling the unit on and off on set spray liquid levels in the sump 68, and for operating control indicator lights; a unit amperage and voltage failure control for cycling the system off in the event of power problems, and for operating control indicator lights; and pressure controls for the refrigeration cycle components. The lower right compartment 20 is also convenient for placement of other optional items, such as alarms for airstream pollutants of particular concern such as carbon monoxide or smoke. Access panels are provided in the walls of the housing 10 for servicing the maintenance requirements of the various components and controls.

In the operation of the liquid spray air purification apparatus shown in FIG. 1, the sump 68 is manually filled through the spray liquid fill port 74 with water or an acid-neutralizing alkali aqueous solution to an appropriate level for efficient operation of the pump 70. By operation of the fan unit 56, a pollutant-containing airstream to be treated is drawn into the airstream inlet opening 36 of the housing 10 through the filter unit 40, where airborne particulate matter in the airstream is removed. The airstream then passes through the first liquid migration eliminator member 44 into the liquid spray chamber 46, where it is sprayed with spray liquid supplied from the sump 68 by the pump 70 through the conduit 72 to the spray nozzle assembly 66. The spray liquid washes the pollutants from the airstream and drains back to the sump 68, and the washed airstream then passes through the second liquid migration eliminator member 48 which functions to mechanically remove liquid from the airstream. The removed liquid drains from the second liquid migration eliminator member 48 back to the sump 68. The airstream then passes through the dehumidifying evaporator unit 50 which functions to remove entrained moisture from the airstream and return the removed moisture through tubing 78 back to the sump 68. The airstream then passes through the heating condenser unit 52 which functions to warm the airstream and thereby decrease its relative humidity. The airstream next passes by the ultraviolet light unit 54 which functions to germicidally treat the airstream. Thereafter the airstream is drawn through the airstream discharge channel 58 and is discharged through the airstream discharge register 60 in the airstream outlet opening 38.

In carrying out the above-described operation on a continuous basis, the sump liquid should be monitored to ensure proper pH levels for effective airstream washing and proper sump liquid levels to enable operation of the pump 70. When and as needed, the sump 68 can be manually drained through the spray liquid drain port 76 and/or manually filled with make-up fresh water and/or with alkali neutralizer through the spray liquid fill port 74.

The liquid spray air purification apparatus illustrated in FIG. 1, with its manual sump filling and draining arrangement, is designed as a portable unit. Alternatively, it can be permanently installed by connection into building plumbing and drainage lines with automatic sump filling and draining capabilities. For example, automatic sump draining would be responsive to the pH of the sump liquid dropping below a set minimum, and automatic sump filling would be responsive to the level of the sump fluid dropping below a set minimum using a float valve arrangement.

Figure 2:
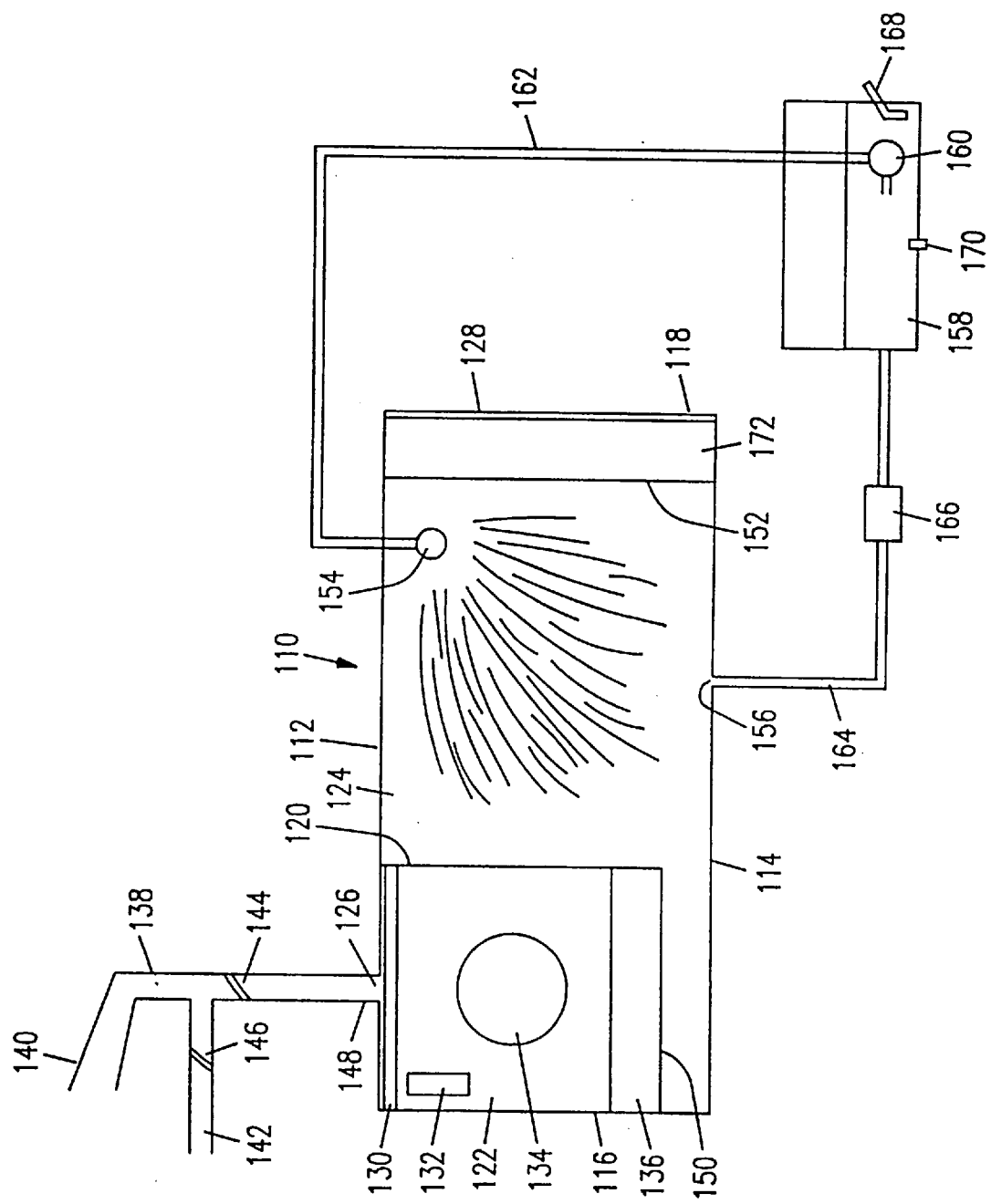

FIG. 2 illustrates an alternative embodiment of the liquid spray air purification apparatus of the present invention which is specifically designed for use in various motorized vehicles, such as automobiles, buses, trains, ships and aircraft. The embodiment shown in FIG. 2 includes a horizontally oriented hollow rectangular housing 110 made of a corrosion-resistant material such as stainless steel, plastic, aluminum or fiberglass. As viewed in FIG. 2, the housing 110 has a top wall 112, a bottom wall 114, a left end wall 116, and an open right end 118. An interior vertical partition member 120 extends parallel to the left end wall 116 from the top wall 112 to above the bottom wall 114, to interiorly divide the housing 110 into a vertically oriented airstream inlet chamber 122 to the left and coextensive with the length of the partition member 120, and a horizontally oriented liquid spray chamber 124 below the airstream inlet chamber 122 and to the right of the partition member 120. The housing 110 further has an airstream inlet opening 126 entering into the airstream inlet chamber 122 through the top wall 112, and an airstream outlet opening 128 through the housing's open right end 118.

The above-described structure of the housing 110 permits airstream flow through the housing 110 along a downstream-directed airstream flow path extending from the airstream inlet opening 126, sequentially through the airstream inlet chamber 122 and the liquid spray chamber 124, to the airstream outlet opening 128. The housing's open right end 118 is adapted to be connected to an air flow duct (not shown) for delivery of the purified airstream from the airstream outlet opening 128 to the space being conditioned, e.g., the cabin of a motorized vehicle.

Operatively disposed in the airstream flow path in the airstream inlet chamber 122, in upstream to downstream order as shown in FIG. 2, are a filter unit 130 effective for removing airborne particulate matter from the airstream flowing therethrough, an ultraviolet light unit 132 selectively operable to germicidally treat the airstream flowing thereby, a wind-drivable fan unit 134 operative for causing downstream-directed airstream flow along the airstream flow path to the airstream outlet opening 128, and a first liquid migration eliminator member 136 disposed horizontally across the downstream end of the airstream inlet chamber 122.

The fan unit 134 is adapted to be driven by an airstream flowing thereby at a suitable flow rate. In this embodiment of the invention, which is specifically designed for use in a motorized vehicle, the apparatus is adapted to enable the use of the atmospheric wind created by the vehicle's motion for driving the fan unit 134. For this purpose, the apparatus is provided with a duct member 138 operatively connected into the airstream inlet opening 126 of the housing 110 and designed to extend outside of the vehicle (not shown). The duct member 138 extends upstream from the airstream inlet opening 126 in a generally vertical orientation and is angled at its inlet end 140 so as to face and receive an airstream in the form of atmospheric wind created by the vehicle's motion. The duct member 138 has a generally horizontally extending airstream bleeder branch 142 disposed downstream from its inlet end 140 for releasing excess airstream from the duct member 138. The duct member 138 is also provided with a first adjustable damper member 144 disposed within the duct member 138 downstream from the airstream bleeder branch 142, and a second adjustable damper member 146 disposed within the airstream bleeder branch 142, the two damper members 144 and 146 together being operative to selectively regulate the flow rate of airstream flowing to the outlet end 148 of the duct member 138 for delivery to the airstream inlet opening 126 of the housing 110, so that said flow rate is effective for driving the fan unit 134. The two damper members 144 and 146 are preferably linked in a manner such that when either of them is moved toward an open position the other is responsibly moved toward a closed position, and vice versa.

The liquid spray chamber 124 has an upstream entrance opening 150 adjacent the downstream end of the airstream inlet chamber 122, and a downstream exit opening 152 adjacent the open right end 118 of the housing 110. Disposed within the liquid spray chamber 124 is a liquid spray nozzle assembly 154 for spraying liquid into the airstream flowing through the liquid spray chamber 124 so as to effect washing of the airstream, and a drain 156 on the bottom of the liquid spray chamber 124. Disposed exteriorly of the housing 110 is a sump 158 for holding a quantity of spray liquid to be supplied in a recirculated manner to the liquid spray nozzle assembly 154 and for receiving liquid drainage from the washing of the airstream. A pump 160 is communicatable with spray liquid in the sump 158 and is interconnected to the liquid spray nozzle assembly 154 through a first conduit 162 for supplying spray liquid from the sump 158 to the liquid spray nozzle assembly 154. A second conduit 164 interconnects the drain 156 on the bottom of the liquid spray chamber 124 to the sump 158 for delivering liquid drainage from the washing of the airstream to the sump 158. Connected into the conduit 164 is a replaceable pH control canister 166 containing acid-neutralizing alkaline material to maintain the recirculating spray liquid at proper pH levels for effective washing. The sump 158 is provided with a spray liquid fill port 168 adapted for manual filling, and a spray liquid drain port 170 adapted for manual draining.

The first liquid migration eliminator member 136 disposed horizontally across the downstream end of the airstream inlet chamber 122 completely covers the upstream entrance opening 150 of the liquid spray chamber 124. A second liquid migration eliminator member 172 is disposed vertically upstream from the airstream outlet opening 128 and completely covers the downstream exit opening 152 of the liquid spray chamber 124. Together, the first and second liquid migration eliminator members 136 and 172 provide effective containment of substantially all of the spray liquid employed in the system to within a segregated loop formed by the liquid spray chamber 124, the conduit 164, the sump 158, the pump 160 and the conduit 162.

The embodiment illustrated in FIG. 2 is controlled in similar fashion to that described with respect to the FIG. 1 embodiment. The controls (not shown) include a pH control for cycling the unit on and off on set pH values responsive to a pH probe in the sump 158 or in the conduit 162, a liquid level control for cycling the unit on and off on set spray liquid levels in the sump 158, and a unit amperage and voltage failure control for cycling the system off in the event of power problems. Furthermore, the fan unit 134 is preferably provided with the option of being electrically drivable as well as wind-drivable.

The embodiment illustrated in FIG. 2 is suitably installed within the cabin of a motorized vehicle (not shown), with the housing's open right end 118 suitably connected to an air flow duct (not shown) within the cabin, and with the duct member 138 extending outside of the vehicle. In the operation of this embodiment, the sump 158 is manually filled through the spray liquid fill port 168 with water or an acid-neutralizing alkali aqueous solution to an appropriate level for efficient operation of the pump 160. When the vehicle is in motion, atmospheric wind created by the motion will flow into the inlet end 140 of the duct member 138 and through the duct member 138 for airstream delivery to the airstream inlet opening 126 of the housing 110 at a flow rate effective for driving the fan unit 134. The airstream entering the airstream inlet opening 126 passes through the filter unit 130, where airborne particulate matter in the airstream is removed, and then passes by the ultraviolet light unit 132 which functions to germicidally treat the airstream. The airstream next passes through the first liquid migration eliminator member 136 into the liquid spray chamber 124, where it is sprayed with spray liquid supplied from the sump 158 by the pump 160 through the conduit 162 to the spray nozzle assembly 154. The spray liquid washes pollutants from the airstream and drains back to the sump 158 through the drain 156 and conduit 164, and the washed airstream then passes through the second liquid migration eliminator member 172 which functions to mechanically remove liquid from the airstream. The removed liquid drains from the second liquid migration eliminator member 172 back to the sump 158 through the drain 156 and conduit 164. The washed airstream is then discharged through the airstream outlet opening 128 for delivery to the cabin of the vehicle.

It will be understood that the foregoing description of the preferred embodiments is given for purposes of illustration only, and that various modifications may be made in the number, size, capacity and location of the various components of the apparatus depending upon the needs of any particular application. The apparatus may further be provided with various other optional features to suit the needs of particular applications, such as, for example, charcoal filtering or other specialized filtering media, humidity and temperature control, zone air filtering capability, and single/three phase voltage common to the major portions of the world.

The liquid spray air purification apparatus of the present invention is efficient for the purification of any source of polluted air containing water-soluble pollutants including, for example, vog, smog and industrial airborne pollution, as well as internal environmental air rejected through wood burning appliances and any carbon based energy source.

What is claimed is:

1. An air purification apparatus comprising:
    a housing having an airstream inlet opening, an airstream outlet opening, and an airstream flow path extending in a downstream direction within said housing from said airstream inlet opening to said airstream outlet opening;
    a liquid spray chamber disposed within said housing in said airstream flow path, said liquid spray chamber having an upstream entrance opening and a downstream exit opening permitting airstream flow therethrough;
    liquid spray means disposed within said liquid spray chamber for spraying liquid into the airstream flowing through said liquid spray chamber so as to effect washing of said airstream;
    sump means for holding a quantity of liquid to be supplied in a recirculated manner to said liquid spray means, and for receiving liquid drainage from the washing of said airstream;
    recirculation means for supplying liquid from said sump means to said liquid spray means;
    liquid migration eliminator means for providing effective containment of substantially all of said liquid within a segregated loop formed by said liquid spray chamber, said sump means and said recirculation means, said liquid migration eliminator means comprising at least first and second liquid migration eliminator members which act as barriers to the passage of moisture therethrough, said first liquid migration eliminator member covering said upstream entrance opening of said liquid spray chamber, and said second liquid migration eliminator member covering said downstream exit opening of said liquid spray chamber;
    filter means disposed in said airstream flow path exteriorly of said segregated loop and upstream from said first liquid migration eliminator member, said filter means being effective for removing airborne particulate matter from the airstream flowing therethrough; and
    fan means for causing downstream-directed airstream flow from said airstream inlet opening along said airstream flow path to said airstream outlet opening, said fan means being disposed exteriorly of said segregated loop.

2. The air purification apparatus of claim 1, wherein said filter means is disposed at said airstream inlet opening of said housing.

3. The air purification apparatus of claim 1, wherein said filter means comprises an electrostatic filter.

4. The air purification apparatus of claim 1, wherein said recirculation means comprises a pump communicatable with liquid in said sump means, and first conduit means interconnecting said pump and said liquid spray means.

5. The air purification apparatus of claim 4, wherein said sump means and said recirculation means are disposed within said housing.

6. The air purification apparatus of claim 4, wherein said sump means and said recirculation means are disposed exteriorly of said housing, and said apparatus further comprises second conduit means interconnecting said liquid spray chamber and said sump means for delivering said liquid drainage to said sump means.

7. The air purification apparatus of claim 1, further comprising dehumidification means disposed within said housing in said airstream flow path downstream from said second liquid migration eliminator member, said dehumidification means being selectively operable to remove entrained moisture from said airstream exiting said second liquid migration eliminator member for providing more effective containment of said liquid within said segregated loop.

8. The air purification apparatus of claim 7, further comprising drainage means for draining the removed moisture from sad dehumidification means to said sump means.

9. The air purification apparatus of claim 7, further comprising heating means disposed within said housing in said airstream flow path downstream from said dehumidification means, said heating means being selectively operable to warm said airstream exiting said dehumidification means and thereby reduce the relative humidity of said airstream.

10. The air purification apparatus of claim 9, wherein said dehumidification means is an evaporator component of a compression refrigeration system disposed within said housing, and said heating means is a condenser component of said refrigeration system.

11. The air purification apparatus of claim 10, wherein said refrigeration system includes a compressor component disposed within said housing exteriorly of said segregated loop, said compressor component being positioned in said airstream flow path for effective cooling of said compressor component by the airstream flowing thereby.

12. The air purification apparatus of claim 11, wherein said compressor component is disposed upstream from said first liquid migration eliminator member.

13. The air purification apparatus of claim 1, further comprising ultraviolet light means disposed within said housing in said airstream flow path exteriorly of said segregated loop, said ultraviolet light means being selectively operable to germicidally treat the airstream flowing thereby.

14. The air purification apparatus of claim 13, wherein said ultraviolet light means is disposed downstream from said second liquid migration eliminator member.

15. The air purification apparatus of claim 1, wherein said fan means is disposed within said housing in said airstream flow path.

16. The air purification apparatus of claim 15, wherein said fan means is disposed downstream from said second liquid migration eliminator member.

17. The air purification apparatus of claim 15, wherein said fan means is disposed upstream from said first liquid migration eliminator member.

18. The air purification apparatus of claim 17, wherein said fan means operates according to the flow rate of the incoming airstream, and said apparatus further comprises duct means disposed upstream from said airstream inlet opening and having an inlet end for receiving an airstream in the form of atmospheric wind and an outlet end communicating with said airstream inlet opening for delivering thereto said airstream at a flow rate effective for driving said fan means.

19. The air purification apparatus of claim 18, wherein said duct means includes adjustable damper means operative to selectively regulate the flow rate of said airstream delivered to said airstream inlet opening.

20. The air purification apparatus of claim 19, wherein said duct means has an airstream bleeder branch for releasing excess airstream therefrom, and said damper means comprises a first adjustable damper member disposed within said duct means downstream from said bleeder branch and a second adjustable damper member disposed within said bleeder branch.

21. The air purification apparatus of claim 20, wherein said first and second adjustable damper members are linked in a manner such that when either of them is moved toward an open position the other is responsively moved toward a closed position, and vice versa.

22. The air purification apparatus of claim 1, wherein one of said first and second liquid migration eliminator members is disposed vertically within said housing, and the other of said first and second migration eliminator members is disposed horizontally within said housing.

23. The air purification apparatus of claim 22, wherein said first liquid migration eliminator member is disposed vertically within said housing, and said second liquid migration eliminator member is disposed horizontally within said housing.

24. The air purification apparatus of claim 22, wherein said first liquid migration eliminator member is disposed horizontally within said housing, and said second liquid migration eliminator member is disposed vertically within said housing.

* * * * *